Inventor
William H. Lingle
By Ernest S. Mechlin
his Attorney

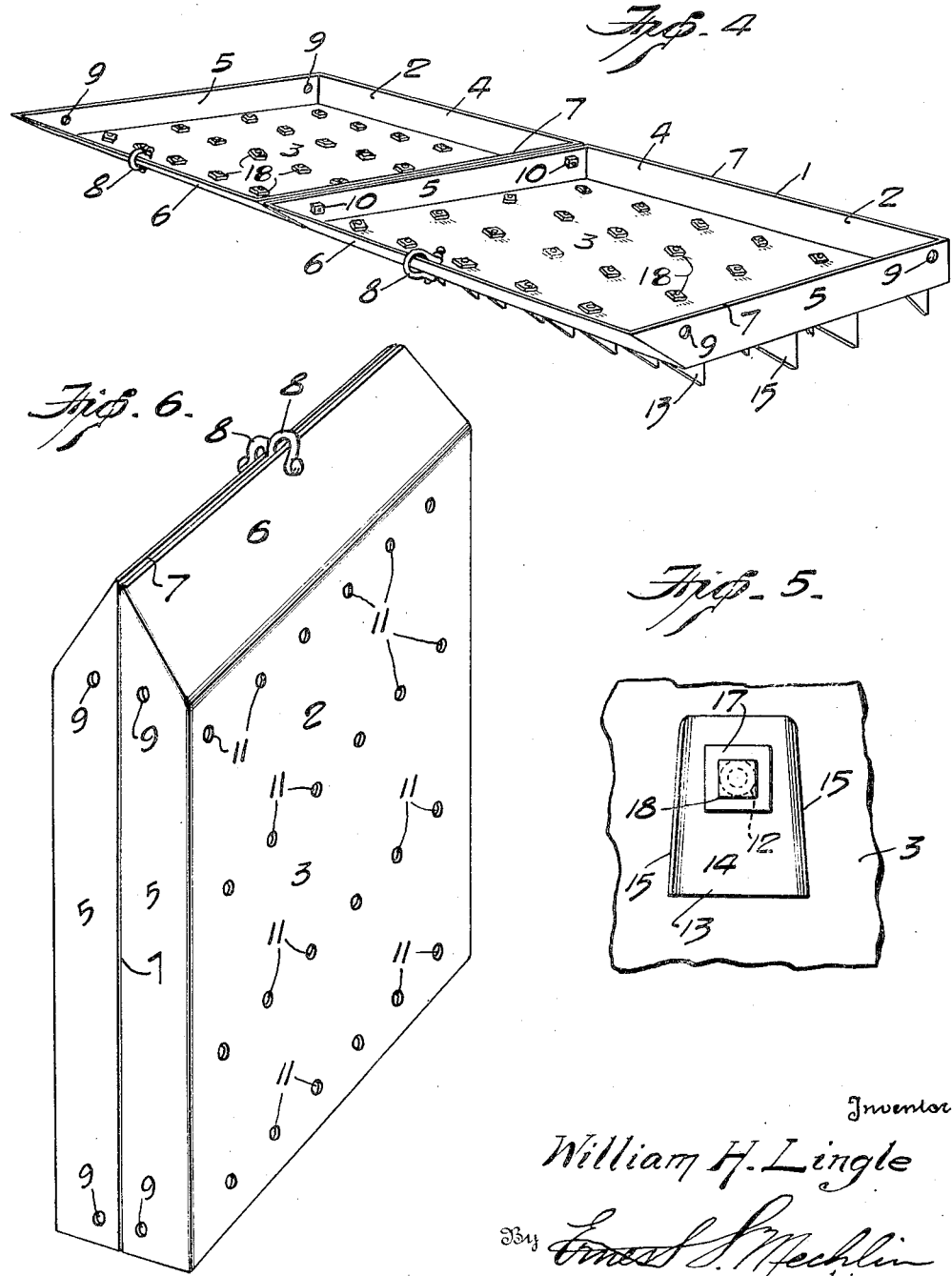

Patented Aug. 17, 1943

2,327,198

UNITED STATES PATENT OFFICE 2,327,198

AGRICULTURAL IMPLEMENT

William H. Lingle, Flint, Mich.

Application February 7, 1942, Serial No. 429,935

5 Claims. (Cl. 55—23)

The invention relates to an agricultural implement, and more particularly to an implement which may be employed as a harrow, disc, weeder and the like.

An object of the invention is the provision of a base plate having teeth, knives or blades, arranged to pivot about a fixed point so as to permit the teeth, knives or blades to move out of the path of draft if they encounter stones or any other firm or hard objects.

Another object of the invention is the provision of a plurality of members pivotally secured to a base plate and presenting teeth or blades; the members being so disposed and arranged that no two teeth or blades are in longitudinal alignment.

A further object of the invention is the provision of a base plate having a circumambient peripheral flange with a free edge of constant height so that a pair of base plates may be associated for storage, and each base plate will be of sufficient structural rigidity to overcome the forces to which it will be subjected in service.

The above, as well as numerous other objects, will become apparent from the succeeding description, considered together with the accompanying drawings which exemplify a form of the invention and wherein:

Figure 4 is a perspective top view of a plurality of implements of the present invention, being illustrated in assembled relation.

Figure 5 is a bottom plan view of a portion of the agricultural implement.

Figure 6 is a perspective side view of a plurality of associated agricultural implements of the present embodiment, illustrating a suggested relationship for the purpose of storage.

Figure 2:
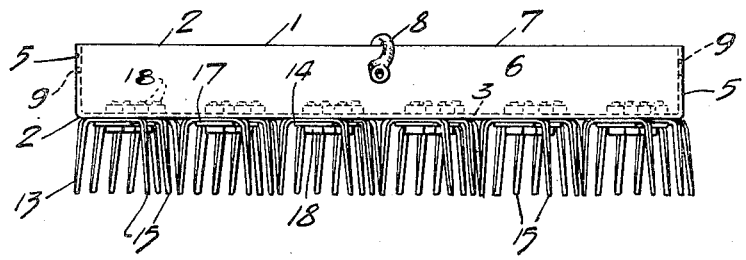
Figure 2 is a front end elevational view of the agricultural implement illustrated in Figure 1.
Figure 1:
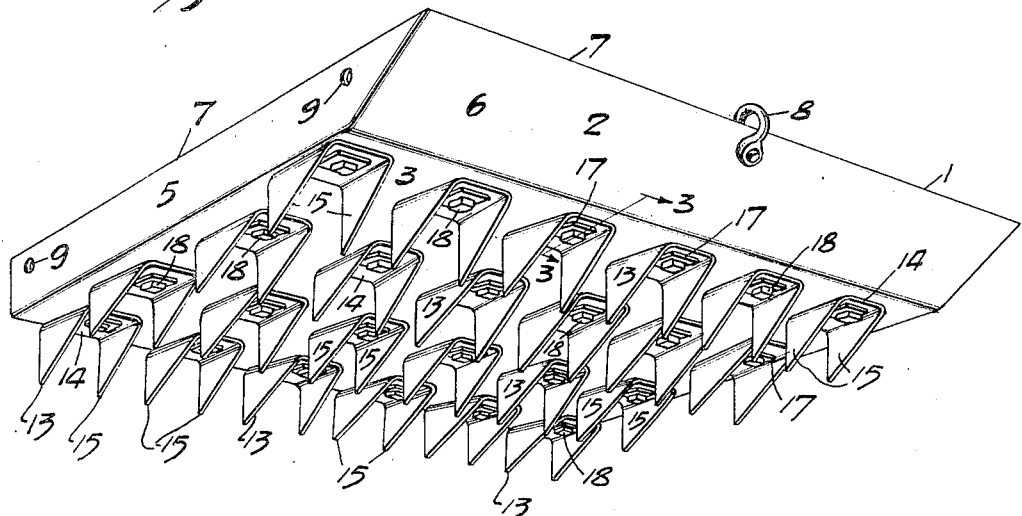
Figure 1 is a perspective bottom view of an agricultural implement embodying the present invention.

Referring now in detail to the drawings, wherein like reference characters designate like parts, the numeral 1 is employed to indicate in a general manner an agricultural implement which, for the purpose of convenience, will be hereinafter referred to as a harrow. As hereinbefore indicated, and as will become apparent from a perusal of the succeeding description, the structure of the present invention may be employed for numerous offices in the process for the treatment of soil. To specifically set forth some of the uses of the structure under consideration, it may be used as a harrow to level or pulverize the soil or cover seeds after planting, as a weeder for extirpating weeds and analogous uses.

The harrow comprises a body plate, base member or boat-like structure 2 formed of a continuous sheet of metal of sufficient thickness and properties to withstand the forces and uses to which it will be subjected in service. The body plate is formed by a lower plate 3 having side, vertically disposed flanges 5 upstanding from one face thereof, along the lateral edges or limits of the body plate. Joining the adjacent or corresponding edges of the side flanges is a rear flange 4 extending vertically from the rear edge of the lower plate from the same side thereof as the side flanges. Extending across the front of the body plate is a front or forward flange 6 upstanding in an inclined vertically disposed direction from the leading edge of the body plate to be joined integrally with the corresponding extremities of the side flanges. The body plate thus formed presents an upwardly opening container which may accommodate any heavy object such as rocks, sacks of sand and the like for weighting the body plate down upon the ground, for the purpose to be hereinafter apparent.

It is also to be noted that the thus far described structure may be employed as a sled or bed for transporting objects from one location to another. The front flange is initially disposed at an acute angle to the horizontal, so as to form a guiding or deflecting member capable of permitting the harrow to be drawn over uneven ground, and not become lodged against any objects which might be protruding above the plane along which the harrow is drawn. Another object for inclining the front flange is that it may conform to the rear end of a mouldboard, whereby the soil may be fitted as soon as it is plowed or immediately thereafter. The free edges 7 of all of the flanges desirably are of a constant height from the lower plate 3; that is to say, the flanges all extend vertically for an equal distance from the lower plate, and since all of the flanges in effective form a continuous flange circumambient the periphery of the lower plate, two base plates may be associated as illustrated in Figure 6 of the drawings, for the purpose of storage.

In alignment with the longitudinal axis of the base member is a hasp or U-shaped member 8, pivotally connected or secured to the front flange in straddling relation therewith. The hasp is employed as an attaching means with which a cable, drafting or towing means (not shown) may be associated for pulling or drawing the harrow. It may at times be found advisable, as well as advantageous, to increase the span of the harrow, and for the accomplishment of this purpose the side flanges are provided with openings 9 for the accommodation of locking members or bolts 10 which secure two or more harrows together to form a single extended harrow, as illustrated particularly in Figure 4 of the drawings.

Cutting means is associated with the underneath portion of the body plate, and as exemplary of a preferred means, there is provided a plurality of transversely directed, longitudinally spaced rows of apertures or circular holes 11, with the holes in any given row staggered with respect to the holes in the other rows; that is to say, no holes of the respective rows are in longitudinal alignment, so that the holes effect an offset relationship. Associated with each aperture is a pivotal, circular or annular disc 12 in subjacent relation with the lower plate, and having an opening in vertical alignment with the related aperture. Positioned so as to correspond with the location of the apertures are a plurality of rows of cutting, tilling or soil-treating members 13, generally of channel or inverted U-shaped configuration, and preferably comprising a rectangular web 14 having laterally spaced, triangular or gusset-shaped knives or teeth forming legs or blades 15 depending therefrom. Each member web has, located on its longitudinal axis, an opening or circular hole 16 of a dimension to neatly accommodate a related disc so that each disc will lie in the horizontal plane of a member web and form a means about which the member may pivot. The opening 16 is positioned approximately or substantially a third of the distance back from the leading edge of each member web so that the resultant vertical forces will at all times maintain the member in contact with the lower surface of the lower plate 3 and thereby overcome or prevent a tilting action of the member.

Figure 3:
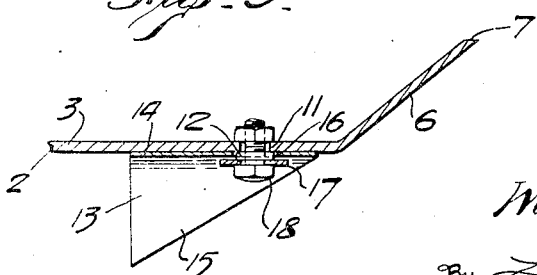
Figure 3 is a vertical sectional view through an illustrative portion of the agricultural implement and being taken along the line 3—3 of Figure 1, looking in the direction of the arrows.

Within the confines of each member is a washer 17 or any other suitable spanning means which is in bearing relation with a related disc and extends beyond the limits of the disc to form a means for retaining the member in a predetermined, assembled relationship with the associated disc. Locking means, such as the illustrated commercial bolt 18, is extended through each washer, disc and aperture 11, for removably securing each member to the body plate. It will be noted by referring particularly to Figure 3 of the drawings, that the thickness of each disc is slightly greater than the thickness of the member web with the difference in thickness permitting the free, pivotal movement of each member.

The legs or teeth of each member are flared or inclined outwardly, that is to say, the distance between the front or leading extremities of the legs is desirably less than the distance between the rear or trailing extremities thereof, so that as the teeth pass through the soil they will effect a washing action or move the soil laterally. Also because of the particular disposition of the legs or teeth, any hard object such as a stone being encountered by the member, will not become lodged between the related legs of a single member, and any such object too dense to be severed by the legs, which may lie in the path of or pass between legs of two adjacent members, will merely cause the effected members to pivot out of the path of the object and assume its natural or normal position after having passed the object. With the present harrow it will not be necessary to pass over soil repeatedly in order to accomplish the purpose intended, since the apertures 11 are so arranged and the members are so constructed that a single passage of the harrow will cause the triangular blades to shear the soil into extremely narrow strips, and in addition thereto, move the soil sideways to effect a thorough working of the soil.

From the above it will be noted that numerous changes and alternations may be made to the illustrated and described construction without departing from within the spirit of the invention and scope of the appended claims.

I claim:

1. In a harrow structure, the combination of a body plate formed of a continuous sheet of metal, means for reinforcing certain marginal edges of said plate, said plate intermediate the marginal edges thereof being provided with a plurality of transversely extending rows of apertures with the apertures in any given row being staggered with reference to apertures in any other row, disc means associated with said apertures, and a plurality of inverted U-shaped members forming harrow teeth pivotally associated with said disc means and plate, the base of each U-shaped member engaging the adjacent surface of said body plate.

2. In a harrow structure, the combination of a body plate formed of a continuous sheet of metal having a peripheral outstanding flange, said body plate being provided with a plurality of transversely extending rows of openings with the openings in any row being out of longitudinal alignment with reference to openings in any other row, disc means associated with said openings, a plurality of inverted U-shaped members having said discs substantially within the confines thereof, and means for maintaining said members, plate and discs in assembled relation; said U-shaped members having spaced legs presenting harrow teeth with said legs being flared.

3. In a harrow structure, the combination of a body plate formed of a continuous sheet of metal having a circumambient peripheral flange, said body plate being provided with a plurality of transversely extending rows of apertures with apertures of any row being staggered with respect to the apertures of any other row, a plurality of circular discs bearing against said body plate and associated with said apertures, a plurality of inverted U-shaped members each comprising a web and downwardly extending legs, said webs having circular openings arranged to accommodate said discs for allowing said members to pivot relative to said body plate, and means extending through said body plate, apertures and discs for maintaining said members assembled with said body plate.

4. In a harrow structure, the combination of a body plate formed of a continuous sheet of metal having a circumambient peripheral flange, said flange having a free edge disposed at a constant height from said body plate, said body plate being provided with a plurality of transversely extending rows of apertures positioned within the confines of said flange, the apertures of any given row being staggered with respect to apertures of any other row, disc means associated with said apertures, a plurality of inverted U-shaped members each comprising a web and transversely spaced triangular-shaped legs, each of said webs having a round opening positioned forwardly of the center thereof and accommodating an associated disc means, washer means bearing against said disc means and overlying said member webs, and means locking said washer means in place.

5. In an agricultural implement, the combination of a body plate formed of a continuous sheet of metal having a circumambient peripheral flange with the free edge of the flange disposed at a constant height, said body plate being provided with a plurality of transversely extending rows of apertures positioned within the confines of said flange, the apertures of any given row being staggered with respect to apertures of any other row, disc means associated with said apertures, a plurality of inverted U-shaped members each comprising a web and transversely spaced triangular-shaped legs, said legs being a greater distance apart at one end of said web than at the other end thereof, each of said webs having a round opening positioned forwardly of the center thereof and accommodating an associated disc means, washer means bearing against said disc means and overlying said member webs, and means extending through said washer means, disc means and apertures for retaining said members in place.

WILLIAM H. LINGLE.